Patented Sept. 15, 1953

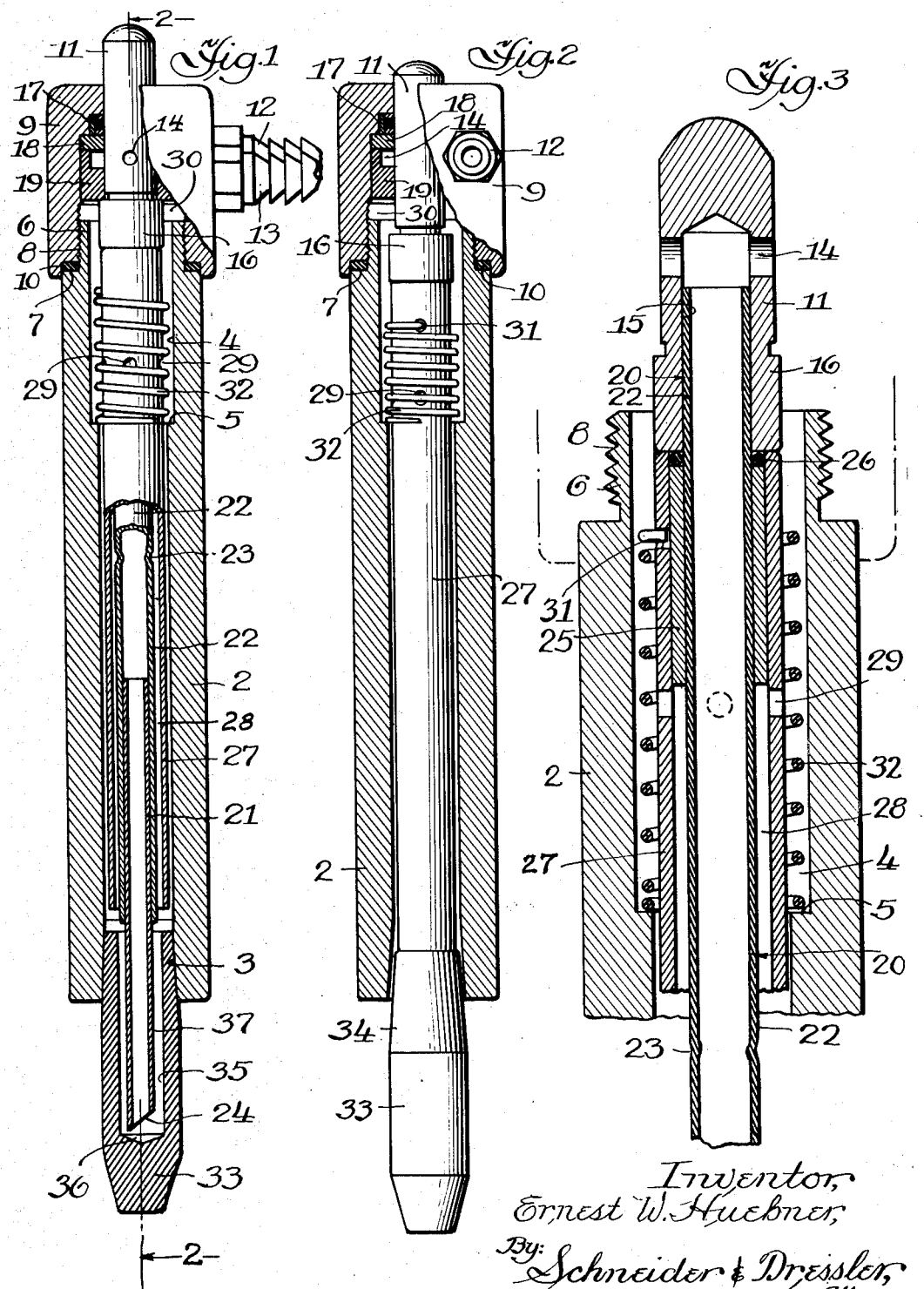

2,652,472

UNITED STATES PATENT OFFICE 2,652,472

WELDING ELECTRODE HOLDER

Ernest W. Huebner, Detroit, Mich., assignor to Weiger Weed & Company, a corporation of Michigan Application September 28, 1951, Serial No. 248,727

4 Claims. (Cl. 219—4)

This invention relates to improvements in welding electrode holders, and more particularly to a water cooled holder having a knockout plunger by means of which the electrode may be removed from the holder.

The welding electrode holder of the present invention comprises an improvement of my prior Patent No. 2,453,320, granted November 9, 1948.

In accordance with the present invention the water tube, which carries the water for cooling the holder and the welding electrode, fits in the knockout plunger with a sliding fit. The water tube extends close to the end of the electrode so that the electrode gets the maximum cooling effect of the water passing through the tube. In the prior art, the water tube was threaded into the knockout plunger. This construction often caused failure of the water tube at the threaded connection with the knockout plunger when the plunger is given a blow to eject the electrode, because of the fatigue caused by constant pounding of the machine in operation. When these tubes fail they are generally discarded, and the welding machine ceases to function properly because there is no delivery of water to the bottom of the electrode.

My improved structure has a compressible sealing ring positioned between the water tube and the knockout plunger to provide a water seal. The water seal is desirable to retard any flow of water around the water tube or between the water tube and the plunger because the water tube fits slidably into the plunger.

The structure by means of which the above and other advantages of the invention are attained will be described in detail in the following specification, taken in conjunction with the accompanying drawings, showing a preferred illustrative embodiment of the invention in which:

Figure 1 is a longitudinal sectional view of a welding electrode holder illustrating a preferred embodiment of the invention with the parts in their normal operative position;

Fig. 2 is a longitudinal sectional view of the holder, taken along the line 2—2 of Fig. 1, with the knockout plunger depressed to eject the welding electrode; and Fig. 3 is an enlarged fragmentary longitudinal sectional view of the upper portion of the holder.

Referring to the drawings, the reference numeral 2 indicates a holder tube provided with an interior taper 3 at its lower end with the enlarged end of the taper at the lower end of the holder tube. The upper end of the holder tube is provided with an interior recess 4 having a shoulder 5 at its lower end. The outer periphery of the upper end of holder tube 2 is recessed to provide an upper edge portion 6 of reduced diameter having a peripheral shoulder 7 at its lower edge. The edge portion 6 is threaded, as indicated at 8, to receive a head 9. A gasket 10, seated on shoulder 7, seals the joint between head 9 and holder tube 2.

The upper end of head 9 is provided with a centrally disposed vertical aperture through which the upper end of a knockout plunger 11 projects. A fitting 12 constituting a water inlet, and a similar fitting 13 constituting an outlet, are secured to head 9 and project laterally therefrom. Fitting 12 communicates with a transverse aperture 14 extending through the plunger and communicating with a longitudinal bore 15 which extends through the bottom of the plunger but terminates short of the top. The lower portion of knockout plunger 11 is provided with a portion 16 of enlarged cross section. Head 9 is counterbored to receive a sealing member 17 and a washer 18 to seal the joint between knockout plunger 11 and the head. A bushing 19 is positioned within head 9 between washer 18 and the upper edge of enlarged portion 16 to guide the vertical movement of the plunger and to form a stop to limit the upward movement of the plunger.

A water tube 20 has its upper end slidably fitted within bore 15 of plunger 11 and extends through the bore of holder tube 2. The water tube is preferably made in two parts within an inner section 21 slidably fitting within the outer section 22 and projecting below the lower end of holder tube 2. The outer section is provided with an inwardly extending rib 23 which limits the upward sliding movement of inner section 21. The lower end of inner section 21 is beveled, as indicated at 24. A ferrule 25 is suitably rigidly connected to the exterior of outer section 22 with its upper edge spaced a short distance below the lower edge of knockout plunger 11. A compressible O-ring 26, fitting snugly around outer section 22 of the water tube, is seated between the upper edge of ferrule 25 and the lower edge of knockout plunger 11 to form a seal therebetween. The O-ring is compressed when the upper end of plunger 11 is moved downwardly by a blow applied to its upwardly projecting portion.

A knockout tube 27, within the bore of holder tube 2, is spaced concentrically from water tube 20 by ferrule 25. Knockout tube 27 fits snugly against ferrule 25. The space 28 surrounding the outer surface of water tube 20 constitutes the passageway for the water fed through water tube 20 after it has passed through the lower end of the water tube. The knockout tube is provided with a plurality of apertures 29 to permit the water to flow into the recess 4 and thence through a transverse opening 30 in head 9 to the outlet fitting 13. The knockout tube is provided near its upper end with another aperture 31 into which one end of a coiled compression spring 32 extends. Spring 32 encircles the upper portion of knockout tube 27 and fits within recess 4 with its lower end bearing against shoulder 5.

A welding electrode 33 adapted to be used in the holder has the upper portion of its outer surface tapered, as indicated at 34, to conform to the taper 3 so that it may fit snugly in the holder. The electrode is provided with a longitudinal bore 35 having a bottom 36 spaced from the lower end of the electrode to provide a solid end suitable for welding purposes. The bore is wider than the end of inner section 21 of the water tube to provide a space 37 which communicates with space 28. The end 24 of the inner section 21 is beveled so that if it engages the bottom 36 of bore 35 the water will still be able to flow from inside the water tube into space 37 and from there to the outlet 13.

When it is desired to eject electrode 33 from the holder a sharp downward blow is struck against knockout plunger 11. This causes knockout tube 27, the upper edge of which is in direct contact with the lower end of the plunger, to move downwardly so as to transmit the force of the blow to the upper end of the electrode and thereby eject it. The inner section 21 of the water tube is slidable relative to the outer section 22. Accordingly, if the inner section becomes loose so as to slide downwardly far enough to contact the inner surface of the electrode it will be pushed back into the outer section by the impact of the ejection without damaging the tube. As the knockout tube moves downwardly it compresses spring 32, and as soon as the force moving the plunger downwardly is released, the spring expands, thereby moving plunger 11 back to its normal position.

Although I have described a preferred embodiment of my invention in considerable detail, it will be understood that the description is intended to be illustrative, rather than restrictive, as many details may be modified or changed without departing from the spirit or scope of the invention. Accordingly, I do not desire to be restricted to the exact structure described.

I claim:

1. A welding electrode holder comprising a holder tube tapered inwardly at its lower end to receive an electrode, a knockout tube positioned within said holder tube, a knockout plunger positioned above said knockout tube with its lower end engaging the upper end of said knockout tube whereby force applied downwardly against said plunger is transmitted directly against said knockout tube, a water tube positioned within said knockout tube, the upper edge of said water tube being slidably positioned within said plunger, a ferrule rigidly secured to the outer surface of said water tube to space it from said knockout tube, the upper edge of said ferrule being spaced slightly below the lower end of said plunger, and compressible sealing means between the upper edge of said ferrule and the lower end of said plunger.

2. A welding electrode holder comprising a holder tube, a knockout tube positioned within said holder tube, a water tube positioned within said knockout tube, the ends of said water tube projecting beyond the ends of said knockout tube, a ferrule rigidly secured to the outer surface of said water tube to space it concentrically relative to the inner surface of said knockout tube, a compressible sealing ring encircling said water tube adjacent one edge of said ferrule, and a knockout plunger slidably fitted over one end of said water tube, one edge of said knockout plunger fitting over said sealing ring and one edge of said knockout tube, whereby force applied axially against the other edge of said plunger is transmitted directly to said compressible sealing ring and said knockout tube.

3. A welding electrode holder comprising a holder tube, an apertured head secured to one end of said holder tube, a plunger positioned within said head with one end of said plunger projecting through said aperture, said plunger having a longitudinal bore terminating short of the projecting end, a water inlet extending through said head and communicating with said bore, a water tube within said holder tube and having one end slidably fitted within said bore to form a passageway for water fed through said inlet to cool said holder, a ferrule encircling said water tube and rigidly secured thereto, a compressible sealing ring encircling said water tube and positioned between said ferrule and said plunger, and a knockout tube positioned within said holder tube and encircling said water tube and said ferrule, said ferrule spacing said knockout tube concentrically from said water tube to form a passageway through which water flowing from said water tube is guided to an outlet, said knockout tube having one edge positioned adjacent one end of said plunger, whereby force applied axially to said plunger is transmitted directly to said knockout tube to move it vertically relative to said holder tube.

4. A welding electrode holder comprising a holder tube, a head secured to one end of said holder tube, said head being provided with an aperture through its top and with a water inlet and outlet terminating in separate fittings projecting laterally therefrom, a plunger having an end projecting through said aperture, said plunger having a longitudinal bore terminating short of said projecting end and a transverse bore communicating with said water inlet and said longitudinal bore, a water tube positioned within said holder tube and having one end slidably fitted within said longitudinal bore, a knockout tube positioned within said holder tube, a spacing member rigidly secured to said water tube to space said knockout tube concentrically relative thereto, and a compressible sealing member positioned between said spacing member and said edge of the plunger, the edge of said plunger surrounding said longitudinal bore abutting one edge of said knockout tube and overlying said spacing member, whereby force applied axially of said plunger will cause relative longitudinal movement between the knockout tube and the holder tube.

ERNEST W. HUEBNER.

References Cited in the file of this patent

UNITED STATES PATENTS

| Number | Name | Date |
|---|---|---|
| 2,271,119 | Cox | Jan. 27, 1942 |
| 2,429,825 | Kruitbosch | Oct. 28, 1947 |
| 2,453,320 | Huebner | Nov. 9, 1948 |